(12) United States Patent
Kim et al.

(10) Patent No.: US 8,212,783 B2
(45) Date of Patent: Jul. 3, 2012

(54) TACTILE AND VISUAL DISPLAY DEVICE

(75) Inventors: Seong Hyun Kim, Daejeon (KR); Yong Suk Yang, Daejeon (KR); Jin Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1068 days.

(21) Appl. No.: 11/930,348

(22) Filed: Oct. 31, 2007

(65) Prior Publication Data
US 2008/0129705 A1    Jun. 5, 2008

(30) Foreign Application Priority Data

Dec. 5, 2006 (KR) .................. 10-2006-0122356
May 31, 2007 (KR) .................. 10-2007-0053118

(51) Int. Cl.
  *G06F 3/041* (2006.01)
(52) U.S. Cl. ...................................................... 345/173
(58) Field of Classification Search .......... 345/173–178; 340/407.1–407.2; 434/112–114
See application file for complete search history.

(56) References Cited

U.S. PATENT DOCUMENTS

| | | | |
|---|---|---|---|
| 5,389,849 A | 2/1995 | Asano et al. | |
| 5,717,423 A | 2/1998 | Parker | |
| 6,462,840 B1 | 10/2002 | Kravtsov | |
| 6,535,201 B1 | 3/2003 | Cooper et al. | |
| 6,580,417 B2 | 6/2003 | Rosenberg et al. | |
| 6,747,631 B1 | 6/2004 | Sakamaki et al. | |
| 7,379,054 B2 | 5/2008 | Lee | |
| 7,589,714 B2 | 9/2009 | Funaki | |
| 2003/0117371 A1 | 6/2003 | Roberts et al. | |
| 2005/0243072 A1* | 11/2005 | Denoue et al. | 345/179 |

FOREIGN PATENT DOCUMENTS

| | | | |
|---|---|---|---|
| JP | 06-261738 A | | 9/1994 |
| JP | 7-113703 A | | 5/1995 |
| JP | 2000-148393 A | | 5/2000 |
| JP | 2002-041208 A | | 2/2002 |
| JP | 2003-248540 | * | 9/2003 |

(Continued)

OTHER PUBLICATIONS

H. Tang, and D. J. Beebe "A Microfabricated Electrostatic Haptic Display for Persons with Visual Impairments," IEEE Transactions on rehabilitation engineering, vol. 6(3), (1998), pp. 241-248.*

(Continued)

*Primary Examiner* — Sumati Lefkowitz
*Assistant Examiner* — Robert E Carter, III
(74) *Attorney, Agent, or Firm* — Rabin & Berdo, P.C.

(57) ABSTRACT

Provided is a tactile and visual display device enabling visual information and tactile information to be simultaneously sensed. The tactile and visual display device includes: a display unit comprising a plurality of scan lines, a plurality of data lines and a plurality of pixels; a tactile sensation generator mounted over the display unit, transmitting light emitted from the pixels, comprising a transistor electrically connecting a plurality of corresponding pixels formed to correspond to the pixels with adjacent corresponding pixels, and generating an electrostatic force and a magnetostatic force; and a sensor in contact with the corresponding pixels to sense the generated electrostatic force or magnetostatic force. Accordingly, the texture of an image displayed on a display is provided as tactile information using an electrostatic force and a magnetostatic force, so that tactile information as well as visual information of the conventional display may be simultaneously provided.

10 Claims, 5 Drawing Sheets

FOREIGN PATENT DOCUMENTS

| | | |
|---|---|---|
| JP | 2004-054961 A | 2/2004 |
| JP | 2004-118859 A | 4/2004 |
| JP | 2006-011646 A | 1/2006 |
| JP | 2006-085489 A | 3/2006 |
| JP | 2006-509289 A | 3/2006 |
| JP | 2006-163579 A | 6/2006 |
| KR | 20-0257172 | 11/2001 |
| KR | 1020050084190 A | 8/2005 |
| KR | 2005-0096219 | 10/2005 |
| KR | 10-0590576 B1 | 6/2006 |
| WO | WO-01/59557 | 8/2001 |
| WO | WO-2004/051451 A2 | 6/2004 |

OTHER PUBLICATIONS

M. B. Khoudja, M. Hafez, J.-M. Alexandre, A. Kheddar, and V. Moreau "VITAL: A New Low-Cost Vibro-Tactile Display System," Proceedings of the 2004 International Conference on Robotics & Automation (2004), pp. 721-726.*

H. Kajimoto, N. Kawakami, and S. Tachi "SmartTouch: Skin to Touch the Untouchable," IEEE Computer Graphics and Application, vol. 24 Jan./Feb. 2004, pp. 36-43.*

K. A. Kaczmarek, M. E. Tayler, and P. Bach-y-Rita "Pattern Identification On a Fingertip-Scanned Electrotactiel Display," Proc. of the 11th Symposium on Haptic Interfaces for Visual Environment and Teleoperator Systems, Haptic Symposium 2003 (2003), pp. 40-46.*

E. Mallinckrodt, A. L. Hughes, and J. W. Sleator "Perception by the Skin of Electrically Induced Vibration," Science, vol. 118 (1953), pp. 277-278.*

"Electrostatic Tactile Display With Thin Film Slider and Its Application to Tactile Telepresentation Systems", Akio Yamamoto et al., IEEE Transaction on visualization and Computer Graphics, IEEE Computer Society, vol. 12, No. 2, pp. 168-177, Mar./Apr. 2006.

"An Electrotactile Display", Robert M. Strong et al., IEEE Transactions on Man-Machine Systems, vol. MMS-11, No. 1, pp. 72-79, Mar. 1970.

* cited by examiner

TACTILE AND VISUAL DISPLAY DEVICE

CROSS-REFERENCE TO RELATED APPLICATION

This application claims priority to and the benefit of Korean Patent Application No. 2006-122356, filed Dec. 5, 2006, and No. 2007-53118, filed May 31, 2007, the disclosure of which is incorporated herein by reference in its entirety.

BACKGROUND

1. Field of the Invention

The present invention relates to an active matrix type tactile and visual display device, and more particularly, to a tactile and visual display device in which a portion generating a tactile sensation and a portion generating a visual sensation are integrated.

2. Discussion of Related Art

While the five senses are the visual, auditory, olfactory, gustatory and tactile senses, current display devices focus on the transmission of visual information. That is, they digitize sound and an image of a phenomenon or an object to transmit virtual information. Currently, demand for the transmission and exchange of information related to other senses is on the rise. Particularly, developments in telecommunications have led to the popularization of TV and Internet shopping malls. If Internet shopping malls provide tactile information such as roughness and friction as well as visual information, this will expand and enrich the market.

Current methods of quantifying and providing information on the tactile sense fall short of meeting the rising demand for such information. Research into a method of interchanging information between media and humans using the five senses has found that the tactile sense is very sensitive to force, vibration, temperature, etc., and thus does not easily lend itself to quantification and simulation.

Conventionally, a mechanical simulator array has been used to simulate the surface texture of an object. When the mechanical simulator array is used, a DC motor, a piezoelectric device, a shape memory alloy actuator, an ultrasonic vibrator, an air jet, a pneumatic actuator, a Peltier device, a surface acoustic wave device (a device using acoustic radiation pressure), a pressure valve device, an ionic conducting polymer gel film, etc., are used to stimulate mechanoreceptors in the skin.

Besides mechanical stimulators, there has also been extensive research into the use of electromagnetic force. For example, H. Tang, and D. J. Beebe disclose the use of an electrostatic force without applying mechanical pressure in "A Microfabricated Electrostatic Haptic Display for Persons with Visual Impairments," IEEE Transactions on rehabilitation engineering, Vol. 6(3), (1998), pp 241-248. Also, M. B. Khoudja, M. Hafez, J.-M. Alexandre, A. Kheddar, and V. Moreau disclose the use of an electromagnetic micro-coil in "VITAL: A New Low-Cost Vibro-Tactile Display System," Proceedings of the 2004 International Conference on Robotics & Automation (2004), pp 721-726. H. Kajimoto, N. Kawakami, and S. Tachi disclose the use of electrostimulation in "SmartTouch: Skin to Touch the Untouchable," IEEE Computer Graphics and Application, Vol. 24 January/February (2004), pp 36-43. K. A. Kaczmarek, M. E. Tayler, and P. Bach-y-Rita disclose the use of direct current (DC) in "Pattern Identification On a Fingertip-Scanned Electrotactiel Display," Proc. of the 11th Symposium on Haptic Interfaces for Visual Environment and Teleoperator Systems, Haptic Symposium 2003 (2003), pp 40-46. This literature concerns the generation of attraction, repulsion, and friction to stimulate the skin. The idea of producing artificial texture using electrostatic force was suggested by Mallinckrodt, et al. (E. Mallinckrodt, A. L. Hughes, and J. W. Sleator "Perception by the Skin of Electrically Induced Vibration," Science, Vol. 118 (1953), pp 277-278) and by Strong, et al. (R. M. Strong, and D. E. Troxel "An Electrotactile Display", IEEE Trans. Man-Machine Systems, Vol. 11(1) (1970), pp 72-79) since it can generate a tactile sensation with a simple structure and, unlike current, it does not have a direct effect on humans.

According to Tang, et al., an electrostatic haptic display with three 7×7 electrode arrays is fabricated on a 4-inch Si wafer using photolithography, and a voltage is applied to produce a tactile sensation and thus form a Braille display. However, in the display, the wiring of each electrode is not easy, and resolution is insufficient to produce the texture of a material. Further, it is not easy to represent a variety of tactile information using the above structures.

SUMMARY OF THE INVENTION

The present invention is directed to a tactile and visual display device in which an active-driving type display device capable of giving a tactile sensation is manufactured to implement a tactile signal that represents a visual signal representing a display image and information on texture in the form of tactile sensation.

The present invention is also directed to a tactile and visual display device in which a tactile sensation generator formed using a transparent electrode is mounted on a conventional flat panel type display unit to easily provide visual information and to generate tactile information.

One aspect of the present invention provides a display unit comprising: a plurality of scan lines, a plurality of data lines and a plurality of pixels; a tactile sensation generator mounted over the display unit, transmitting light emitted from the pixels, comprising a transistor electrically connecting a plurality of corresponding pixels formed to correspond to the pixels with adjacent corresponding pixels, and generating an electrostatic force or a magnetostatic force; and a sensor being in contact with the corresponding pixels to sense the electrostatic force or magnetostatic force generated by the tactile sensation generator.

The corresponding pixels of the tactile sensation generator may comprise a transparent electrode transmitting the light emitted from the display unit, a plurality of address lines and a plurality of scan lines electrically connected to the transparent electrode; a plurality of transistors transmitting a signal applied to the address line according to a scan signal applied to the scan line, and a capacitor storing a voltage corresponding to the transmitted signal.

The sensor may comprise a pad portion comprising sensing pixels corresponding to the corresponding pixels and a pad connector having one end electrically connected to the pad portion and the other end electrically connected to the tactile sensation generator.

The sensing pixels may use a metal material or a conductive material having transparency to sense an electrostatic force. The sensing pixels may use one of Au, Al, Fe, Ag, Pt, ITO and IZO. The sensing pixels may use a permanent magnet to sense a magnetostatic force. The sensing pixels may use a metallic permanent magnet to sense an electric force and a magnetic force. The pad portion may use a material having elasticity and ductility. The material having elasticity and ductility may comprise rubber, polymer, paper, natural fiber and synthetic fiber. In the tactile and visual display device, the transistor connecting each of the corresponding pixels is driven to form rotating current, so that a magnetic force is generated and elasticity and viscosity are represented.

BRIEF DESCRIPTION OF THE DRAWINGS

The above and other objects, features and advantages of the present invention will become more apparent to those of ordinary skill in the art by describing in detail exemplary embodiments thereof with reference to the attached drawings in which.

DETAILED DESCRIPTION OF EMBODIMENTS

The present invention will now be described more fully hereinafter with reference to the accompanying drawings, in which exemplary embodiments of the invention are shown. This invention may, however, be embodied in different forms and should not be construed as limited to the exemplary embodiments set forth herein.

Figure 1:
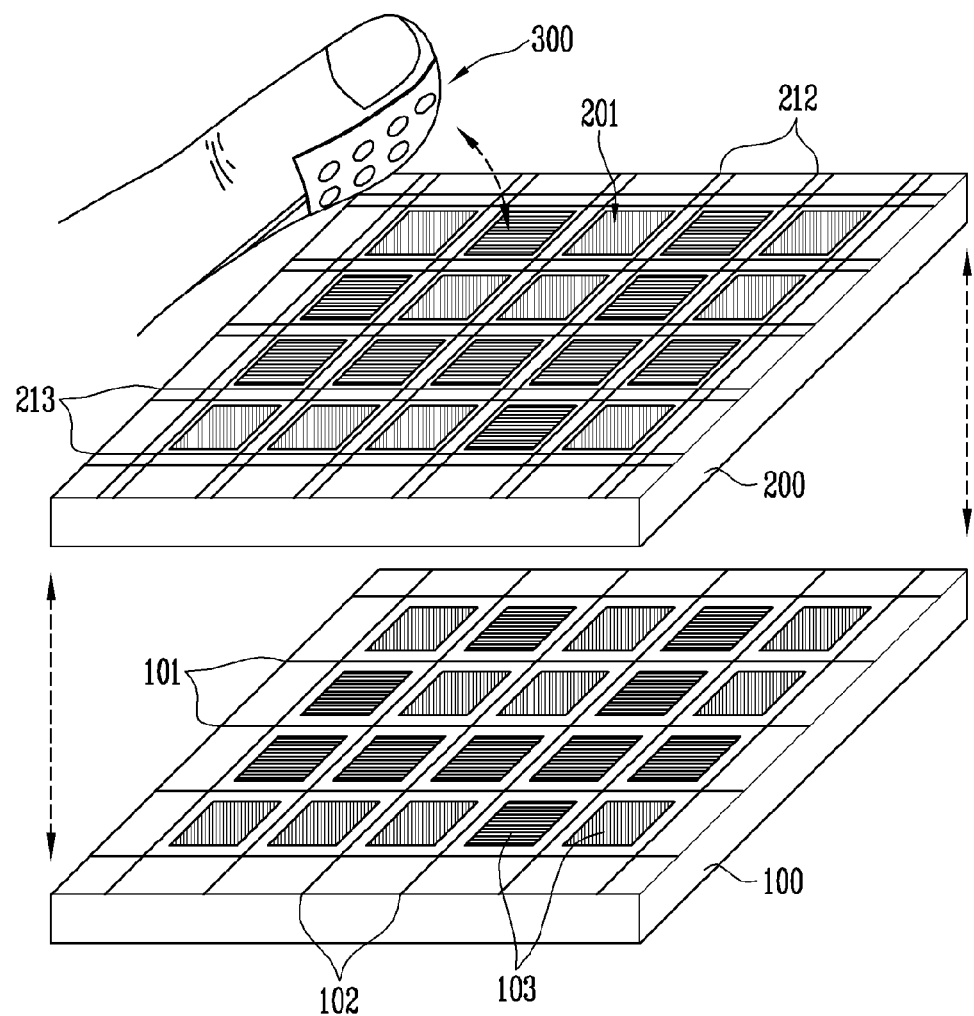
FIG. 1 is a perspective view of a tactile and visual display device according to an exemplary embodiment of the present invention.
Figure 2A:
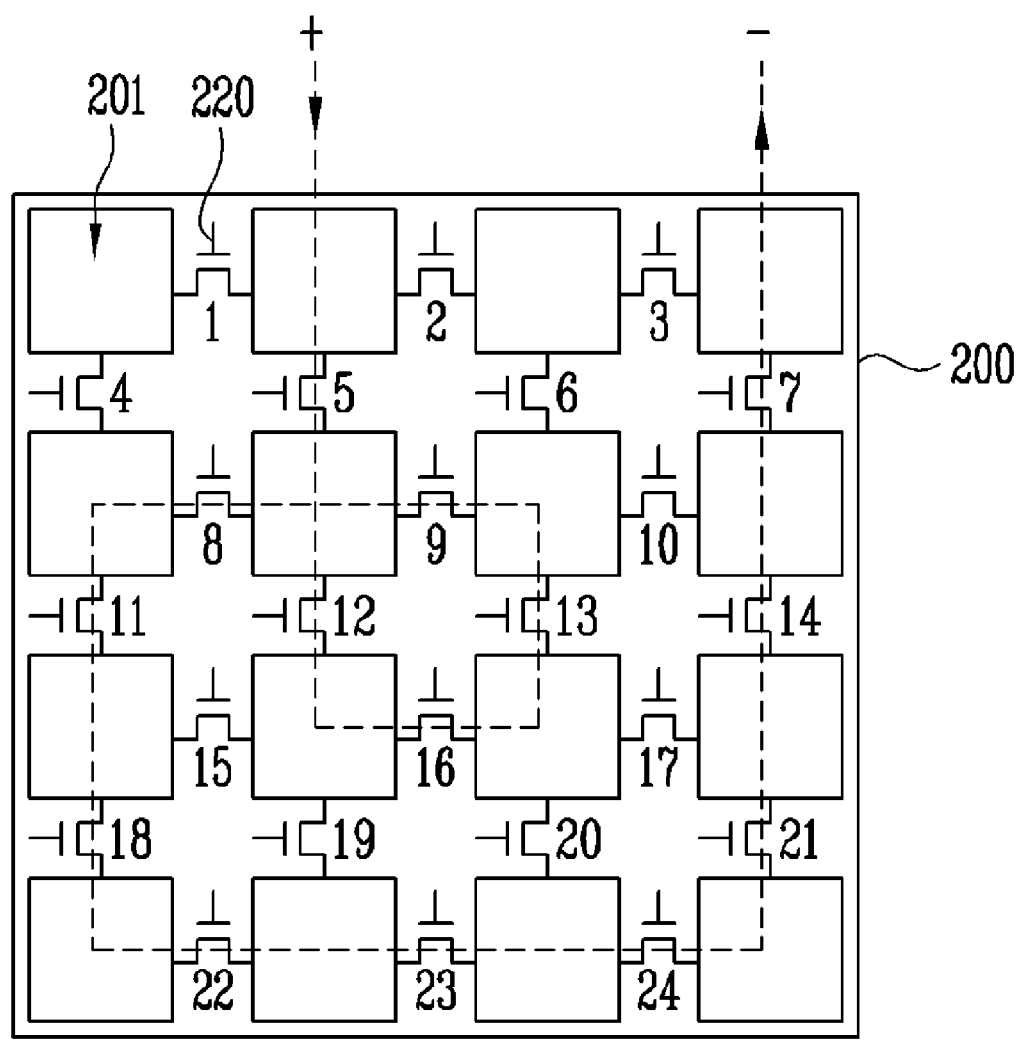
FIG. 2a illustrates the configuration of a tactile sensation generator constituting a tactile and visual display device according to an exemplary embodiment of the present invention.
Figure 2B:
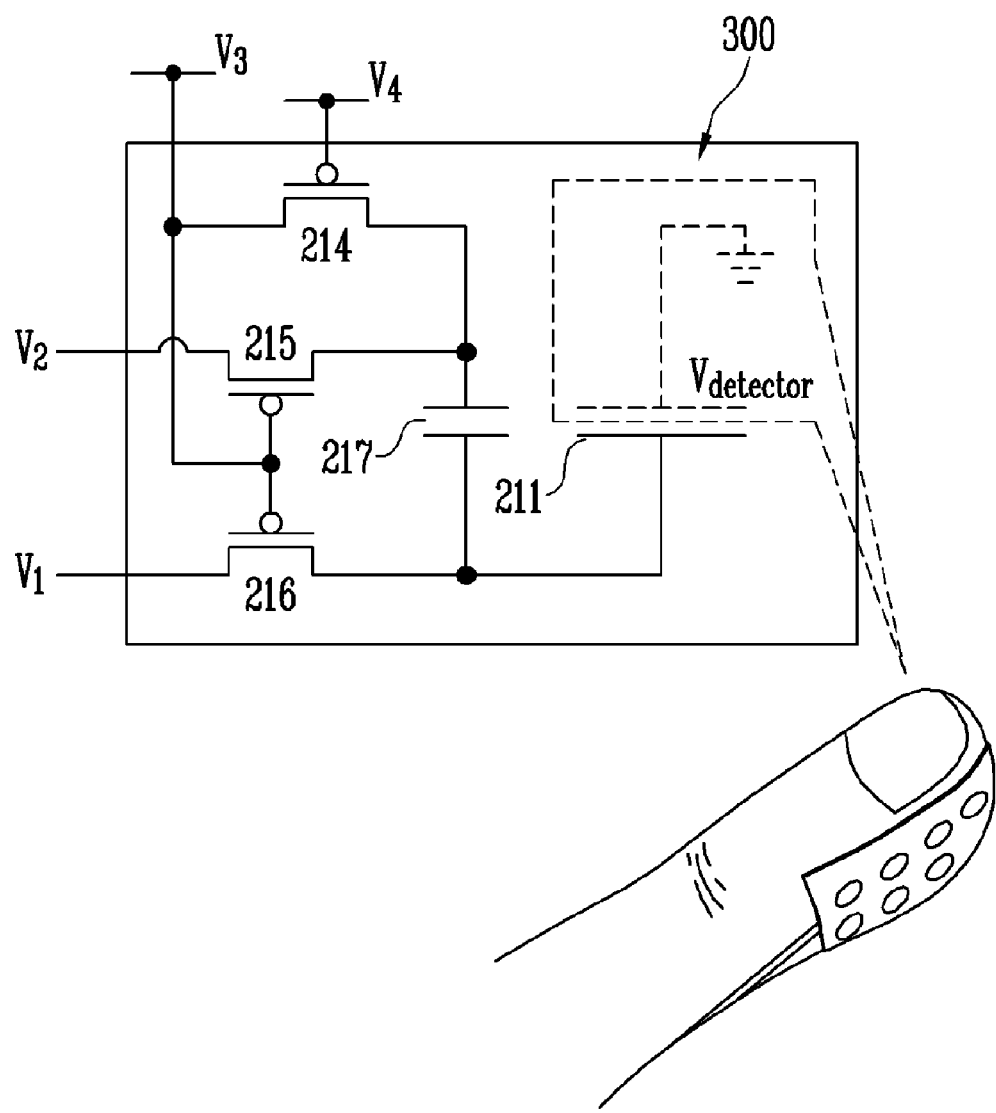
FIG. 2b illustrates the circuit configuration of the corresponding pixel illustrated in FIG. 2a according to an exemplary embodiment of the present invention.

FIG. 1 is a perspective view illustrating the configuration of a tactile and visual display device according to an exemplary embodiment of the present invention, FIG. 2a illustrates a tactile sensation generator constituting the tactile and visual display device according to the present invention, and FIG. 2b illustrates the circuit configuration of a corresponding pixel illustrated in FIG. 2a.

Referring to FIGS. 1, 2a and 2b, a tactile and visual display device 1 according to the present invention includes a display unit 100 formed on a substrate, a tactile sensation generator 200 mounted over the display unit 100 and generating an electrostatic force or a magnetostatic force according to a signal provided by the display unit 100, and a sensor 300 sensing the electrostatic force or the magnetostatic force provided by the tactile sensation generator 200 to perceive tactile information. That is, the tactile sensation generator 200 is mounted over the display unit 100 and transmits light emitted from a display to provide a user with visual information, and transmits the electrostatic force or the magnetostatic force of the surface to the sensor 300, so that a user can perceive tactile information. The sensor 300 is mounted over a user's finger and changes the tactile information generated from the tactile sensation generator 200 to a physical displacement to perceive the information by the user's touch.

Details of the components will be described below. First, the display unit 100 includes a plurality of scan lines 101, a plurality of data lines 102 and a plurality of pixels 103. The tactile sensation generator 200 includes a plurality of corresponding pixels 201 formed to correspond to the pixels 103, and a plurality of field effect transistors ($Tr_1$ to $Tr_{20}$) 220 electrically connecting the adjacent corresponding pixels 201 to each other (Refer to FIG. 2a). The tactile sensation generator 200 connects the corresponding pixels 201 to the field effect transistors 220 and applies a gate voltage to certain field effect transistors in order to generate current of a shape desired by a user, so that an electric field or a magnetic field is generated. The field effect transistors 220 are separately formed from transistors constituting the corresponding pixels 201. The corresponding pixels 201 of the tactile sensation generator 200 may be formed to be the same size as the pixels 103 of the display unit 100. This is so that light generated from the display unit 100 can be transmitted without scattering.

The corresponding pixels 201 of the tactile sensation generator 200 are connected to each other using an active device such as a drive circuit used in an active-matrix device such as a liquid crystal display (LCD). More specifically, referring to FIG. 2, each corresponding pixel 201 of the tactile sensation generator 200 is mounted over the display unit 100 and includes a transparent electrode 211 transmitting light emitted from the pixel 103, a plurality of address lines 212 and a plurality of scan lines 213 electrically connected to the transparent electrode 211, transistors 214 and 215 transmitting a signal applied to the address line according to a scan signal applied to the scan line 213, a capacitor 217 storing a voltage corresponding to the transmitted signal, and a transistor 216 providing a current corresponding to the voltage stored in the capacitor 217 to the transparent electrode 211. When the drive circuit driving the corresponding pixels 201 of the tactile sensation generator 200 has the above configuration, an active-driving circuit included in each of the corresponding pixels 201 can provide charge to each corresponding pixel 201, so that a force may be generated by a phase difference with the sensor 300.

Figure 3:
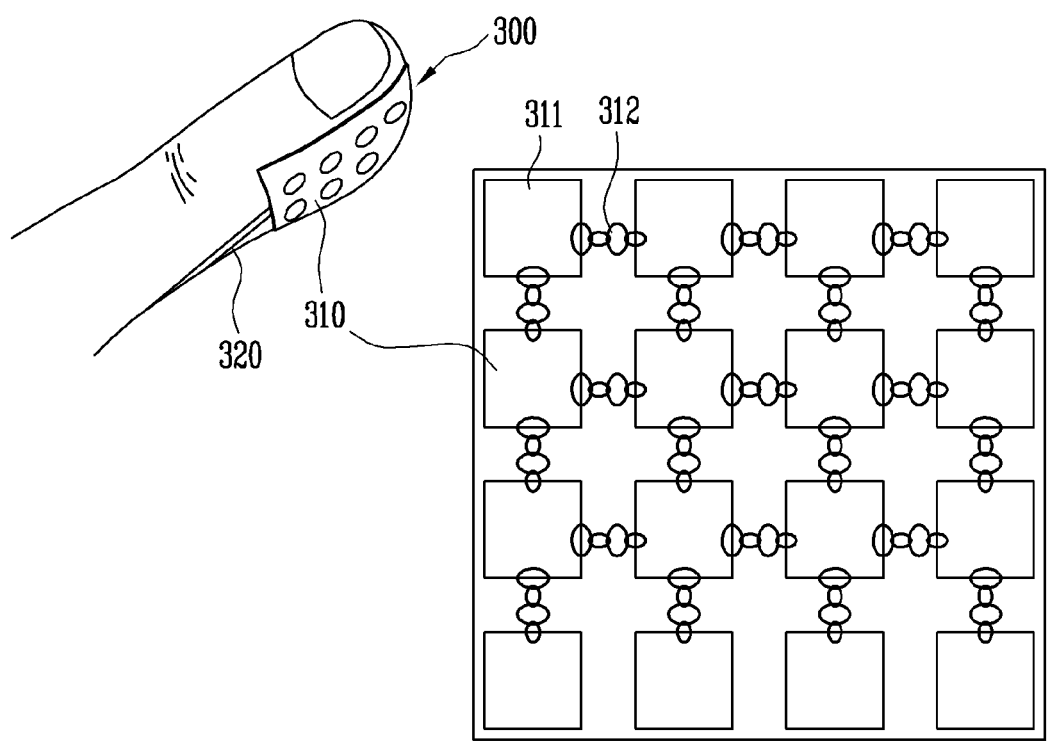
FIG. 3 illustrates a sensor according to an exemplary embodiment of the present invention.
Figure 4:
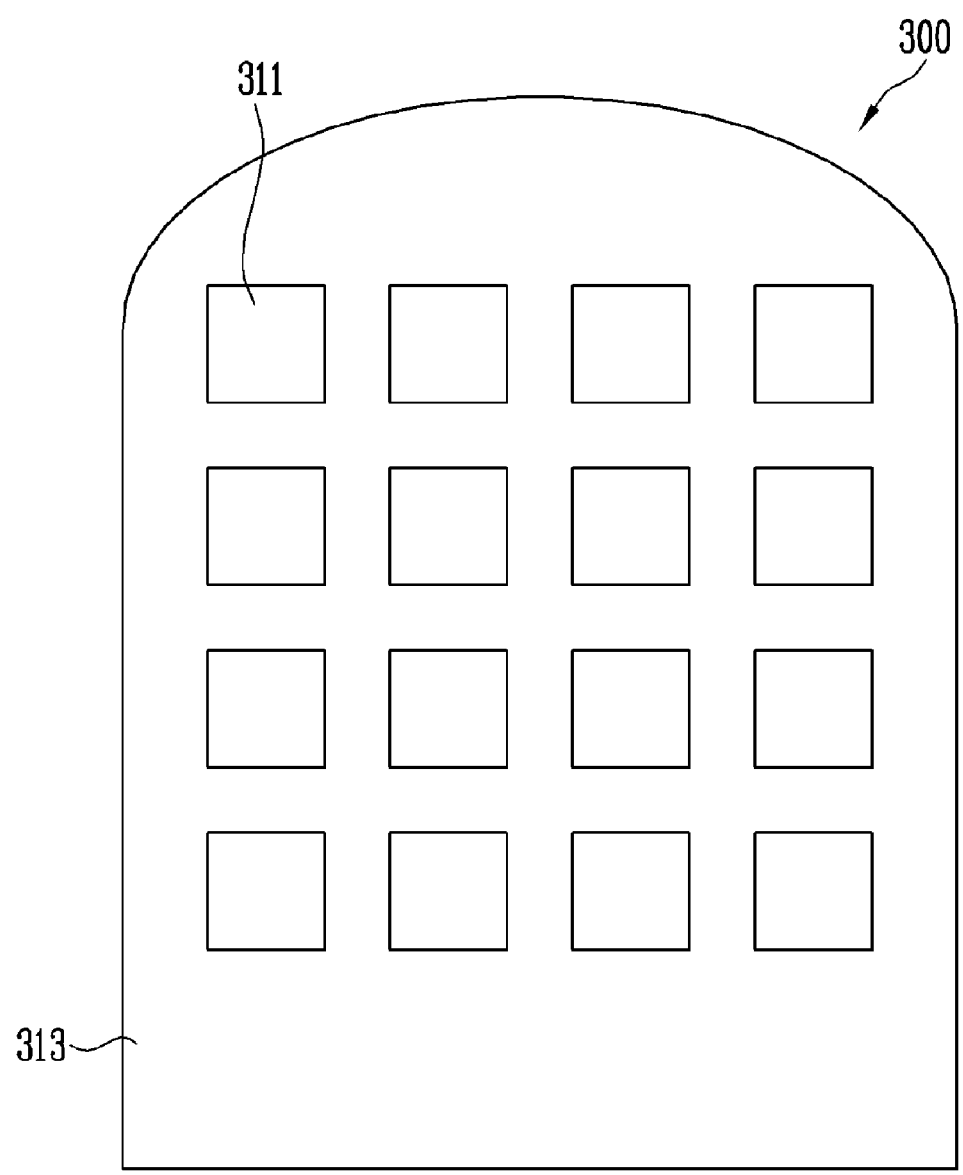
FIG. 4 illustrates a sensor according to another exemplary embodiment of the present invention.

FIG. 3 illustrates an enlarged pad portion 310 of a sensor according to an exemplary embodiment of the present invention, and FIG. 4 illustrates a sensor according to another exemplary embodiment of the present invention.

Referring to FIGS. 3 and 4, the sensor 300 includes a pad portion 310 including a plurality of sensing pixels 311 corresponding to the corresponding pixels 201 of the tactile sensation generator 200, and a pad connector 320 having one end electrically connected to the pad portion 310 and the other end electrically connected to the tactile sensation generator 200. Referring to FIG. 3, the pad portion 310 includes an insulated connecting line 312 connecting the plurality of sensing pixels 311 and the adjacent sensing pixels 311. The insulated connecting line 312 is a component through which current cannot flow, is connected between the sensing pixels 311, includes cotton, silk, rubber, synthetic fiber, etc., and may have various connection types rather than a line connection type. Particularly, the insulated connecting line 312 enables the sensing pixels 311 to freely move while their relative positions are maintained (within 2 mm—humans are insensitive to movement of 1 mm or less).

Each of the sensing pixels 311 of the pad portion 310 is formed of a conductive material to sense an electrical force, or of a magnetic material (including a permanent magnet) to sense a magnetic force. The reason why the sensing pixels 311 are connected to each other by the insulated connecting lines 312 is to insulate the adjacent sensing pixels 311 from each other. Meanwhile, referring to FIG. 4, a plurality of sensing pixels 311 illustrated in FIG. 4 are disposed on an insulation portion 313 having mutual ductility and insulation characteristics. The insulation portion 313 may include rubber, polymer, paper, and natural and synthetic fibers. For example, the plurality of sensing pixels 311 may be attached to latex rubber. The sensing pixels 311 independently move from an electric force or a magnetic force of a lower portion, so that a user can be provided with more precise tactile feedback. The sensing pixels 311 may use a metal including Au, Al, Fe, Ag and Pt, a transparent electrode material including ITO, IZO, etc. to provide an electrostatic force, or a permanent magnet to provide a magnetic force. Furthermore, the sensing pixels 311 may be formed of a metallic permanent magnet to provide both the electric force and the magnetic force, or a multi-layer, in which a material providing an electrostatic force and a material providing a magnetic force are stacked.

An active-driving process of the tactile and visual display device having the above configuration will be described below. The processes of generating texture using the above configuration and measuring a tactile sensation are largely divided into three processes. These are a writing process in which a voltage is applied to both ends of the capacitor 217 using the transistors 214, 215 and 216 to generate a phase difference, a sustaining process in which the charged voltage in a condenser 215 is maintained until the next writing process, and a detecting process in which the sensor 300 approaches the transparent electrode 211 to generate an electrostatic force between both electrodes.

First, a scan pulse voltage $V_3$, which is as large as V, is applied to the transistors 215 and 216 to turn them on. Simultaneously, a first address voltage $V_1$ and a second address voltage $V_2$ are respectively applied to the transistors 215 and 216 to generate a phase difference of $|V_1-V_2|$ at both ends of the capacitor 217. The phase difference generated in the capacitor 217 will be used as a drive voltage that drives the tactile sensation generator 200. After the writing process is completed, the scan pulse voltage $V_3$ is grounded, which is in the state of a zero phase difference, and the transistors 215 and 216 are turned off.

An inverse scan pulse voltage $V_4$ represents an opposite signal to the scan pulse voltage $V_3$. That is, when $V_3$ is applied as large as V, $V_4$ is grounded, and when $V_3$ is grounded, $V_4$ is applied as large as V.

Subsequently, in the writing process, while the transistors 215 and 216 are turned on, the transistor 214 is turned off. Also, in the sustaining process, while the transistors 215 and 216 are turned off, the transistor 214 is turned on. In this process, since the transistor 214 is turned on and $V_2$ is grounded, when the sensor 300 approaches the transparent electrode 211, a closed circuit is formed among the capacitor 217, the transparent electrode 211 and the sensor 300, so that an electrostatic force is produced between the transparent electrode 211 and the sensor 300. This process is the detecting process, in which an electrostatic force is generated between both electrodes, and a phase difference between the transparent electrode 211 and the sensor 300 is the same as a phase difference $|V_1-V_2|$ generated in the capacitor 217. Further, when the sensor 300 moves in the tactile sensation generator 200, a shear force equivalent to the multiplication of an electrostatic force and a surface friction coefficient is generated, and the value and polarity of the voltage of each corresponding pixel 201 may be adjusted over time, so that various changes in the shear force and various textures may be obtained.

Referring to FIG. 2, the tactile sensation generator 200 of the tactile and visual display device according to the present invention may produce coil-shaped current to generate a magnetostatic force, and may generate a force using the magnetization of the sensor 300. For example, when a voltage is applied to a gate electrode of the field effect transistors 5, 7, 8, 9, 11, 12, 13, 14, 16, 18, 21, 22, 23 and 24 that connect the adjacent corresponding pixels 201 of the tactile sensation generator 200, each transistor corresponding to its reference numeral is turned on, so that current that rotates twice is induced. Referring to FIG. 2a, a transistor to which a voltage is applied becomes a conductor, in which current can flow, and a transistor to which a voltage is not applied becomes an insulator, in which current cannot flow, so that the current appears to rotate twice when viewed from the center of the drawing, i.e., appears to flow in the form of swirl from a positive (+) voltage to a negative (−) voltage. The method of driving the tactile and visual display device may produce a coil-shaped current whose number of rotations can be controlled.

The tactile sensation generator 200 is formed of a multilayer, in which a portion generating an electric field and a portion generating a magnetic field are formed, to simultaneously use an electric field and a magnetic field. When each of the sensing pixels 311 of the pad portion 310 is formed of a conductive material to sense an electric force, the portion generating an electric field in the tactile sensation generator 200 may provide height information. When the sensor 300 maintains a positive (+) voltage, a positive voltage (+) is applied to a protruding portion of an image displayed on the tactile sensation generator 200 and a negative voltage is applied to a recessed portion of the image to display the protruding and recessed portions of the image on the display unit 100, a force outwardly directed from the display is applied to the protruding portion of the image, and a force inwardly directed from the display is applied to the recessed portion of the image in the sensor 300, so that a user can perceive bumps and creases as well as a visual image.

When each sensing pixel 311 of the pad portion 310 is formed of a magnetic material to sense a magnetic force, the tactile sensation generator 200 may also use a magnetic field. The tactile sensation generator 200 may use both a static magnetic field and an induced magnetic field among the magnetic fields generated in a circuit. The static magnetic field can provide height information like the electrostatic force, so that a user can perceive bumps and creases. Meanwhile, the induced magnetic field can provide a frictional force, elasticity and viscosity. That is, the tactile sensation generator 200 can represent overall highs and lows by a magnetic force, and detailed highs and lows by an electric force to broaden the representation.

When current flows into the tactile sensation generator 200 to form a magnetic force, according to Lenz's law, the farther away a magnet is, the greater the current, so that the sensor 300 is drawn in. Using this phenomenon, when the sensor 300 formed of a magnetic material moves parallel to the tactile sensation generator 200, the movement is resisted by a induced magnetic field. However, when the current is adjusted to control the force that resists the movement, a frictional force may be controlled. Also, when the sensor 300 formed of a magnetic material moves perpendicular to the tactile sensation generator 200, a force that resists approach of the sensor 300 is generated the same as in parallel movement. This force may control elasticity and withdrawal, and as a result, viscosity may be perceived. A distance between the tactile sensation generator 200 and the sensor 300 may be calculated from electrostatic capacity between the tactile sensation generator and the sensor.

As described above, tactile information is added to a conventional display that provides visual information, to provide the tactile information as well as the visual information. Also, a tactile sensation generator provides an electrostatic force and is formed to have a coil-shaped circuit so that it can implement a magnetic force through a simple structure as well.

Further, the tactile sensation generator is formed to have a multilayer structure that can provide an electric force and a magnetic force to simultaneously represent an electrostatic force and a magnetostatic force. In addition, a sensor connects a plurality of sensing pixels formed of a metal material using an insulated line, so that sensing efficiency is enhanced to provide a user with more accurate information.

Exemplary embodiments of the invention are shown in the drawings and described above in specific terms. However, no part of the above disclosure is intended to limit the scope of the overall invention. It will be understood by those of ordinary skill in the art that various changes in form and details may be made to the exemplary embodiments without departing from the spirit and scope of the present invention as defined by the following claims.

What is claimed is:

1. A tactile and visual display device comprising:
   a display unit comprising a plurality of scan lines, a plurality of data lines and a plurality of pixels;
   a tactile sensation generator mounted over the display unit, transmitting light emitted from said plurality of pixels, including a transistor electrically connecting a plurality of corresponding pixels that each correspond to an adjacent pixel of the display unit, and generating an electrostatic force or a magnetostatic force; and
   a sensor in contact with the corresponding pixels to sense the electrostatic force or magnetostatic force generated by the tactile sensation generator.

2. The device of claim 1, wherein the corresponding pixels of the tactile sensation generator comprise:
   a plurality of transparent electrodes transmitting light emitted from the display unit;
   a plurality of tactile sensation generator address lines and a plurality of tactile sensation generator scan lines electrically connected to the transparent electrodes;
   a plurality of transistors transmitting signals applied to the tactile sensation generator address lines in response to scan signals applied to the tactile sensation generator scan lines; and
   capacitors storing voltages corresponding to the transmitted signals.

3. The device of claim 1, wherein the sensor comprises a pad portion comprising sensing pixels corresponding to the corresponding pixels and a pad connector having one end electrically connected to the pad portion and the other end electrically connected to the tactile sensation generator.

4. The device of claim 3, wherein the sensing pixels use a metal material or a conductive material having transparency to sense an electrostatic force.

5. The device of claim 4, wherein the sensing pixels include one of Au, Al, Fe, Ag, Pt, ITO and IZO.

6. The device of claim 3, wherein the sensing pixels use a permanent magnet to sense a magnetostatic force.

7. The device of claim 3, wherein the sensing pixels use a metallic permanent magnet to sense an electric force and a magnetic force.

8. The device of claim 3, wherein the pad portion includes a material having elasticity and ductility.

9. The device of claim 8, wherein the material having elasticity and ductility comprises rubber, polymer, paper, natural fiber and synthetic fiber.

10. The device of claim 1, wherein the transistor connecting each of the corresponding pixels is driven to form rotating current, so that a magnetic force is generated and elasticity and viscosity are represented.

* * * * *